(12) United States Patent
Ahnert et al.

(10) Patent No.: US 7,905,338 B2
(45) Date of Patent: Mar. 15, 2011

(54) TWIN CLUTCH SYSTEM FOR A TRANSMISSION, PARTICULARLY FOR A TWIN CLUTCH TRANSMISSION

(75) Inventors: Gerd Ahnert, Sasbach (DE); Burkhard Pollak, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/586,119

(22) Filed: Sep. 17, 2009

(65) Prior Publication Data
US 2010/0006386 A1 Jan. 14, 2010

Related U.S. Application Data

(63) Continuation of application No. 10/507,440, filed on Mar. 9, 2005, now abandoned.

(30) Foreign Application Priority Data

Mar. 27, 2002 (DE) .................................. 102 13 618
Aug. 8, 2002 (DE) .................................. 102 36 290

(51) Int. Cl.
*F16D 23/12* (2006.01)

(52) U.S. Cl. .......................................... 192/48.8; 192/98
(58) Field of Classification Search ................. 192/48.8, 192/48.9
See application file for complete search history.

(56) References Cited

U.S. PATENT DOCUMENTS

| 3,185,274 | A | * | 5/1965 | Maurice | 192/48.8 |
| 4,787,492 | A | * | 11/1988 | Ball et al. | 192/48.8 |
| 4,966,270 | A | | 10/1990 | Rispeter et al. | |
| 2002/0060118 | A1 | * | 5/2002 | Beneton et al. | 192/48.8 |

FOREIGN PATENT DOCUMENTS

| FR | 2807481 | 10/2001 |
| FR | 2810708 | 12/2001 |

* cited by examiner

*Primary Examiner* — Rodney H Bonck
(74) *Attorney, Agent, or Firm* — Davidson, Davidson & Kappel, LLC

(57) ABSTRACT

A twin clutch system for a transmission, particularly for a twin clutch transmission, including at least two clutches each having a clutch cover to which at least one disengaging system that actuates the clutches is fastened. According to the invention, a fastening element is provided that couples both coupling covers.

9 Claims, 1 Drawing Sheet

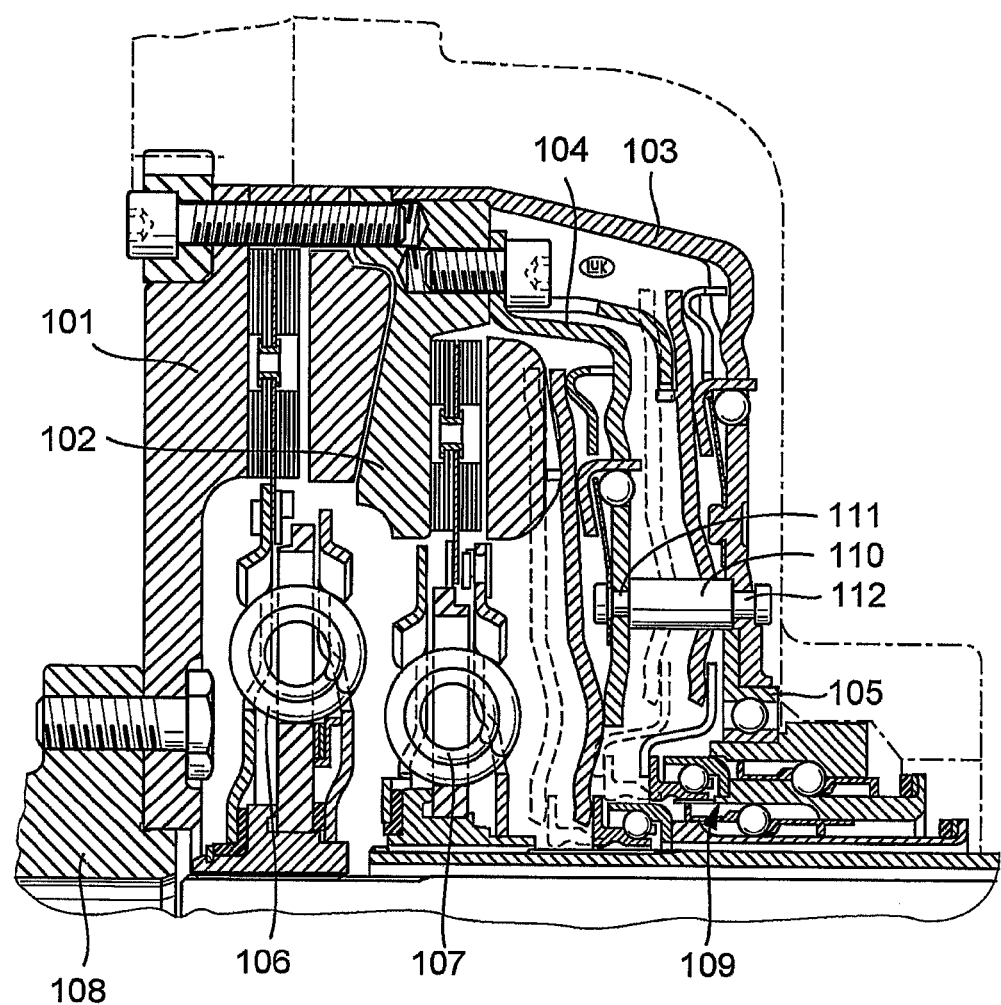

TWIN CLUTCH SYSTEM FOR A TRANSMISSION, PARTICULARLY FOR A TWIN CLUTCH TRANSMISSION

CROSS-REFERENCE TO RELATED APPLICATIONS

This application is a continuation of U.S. patent application Ser. No. 10/507,440 filed Mar. 9, 2005 and hereby incorporated by reference herein. Priority to German Patent Application No. 102 13 618.1, filed Mar. 27, 2002 and German Patent Application No. 102 36 290.4, Aug. 8, 2002 and are hereby incorporated by reference herein, is claimed.

FIELD OF THE INVENTION

The present invention is directed to a twin-clutch system for a transmission, in particular for a twin-clutch transmission, having at least two clutches, each of which has a clutch cover, to which at least one clutch-release system which actuates the clutches is secured.

BACKGROUND

Transmissions, in particular automated transmissions are known from vehicle engineering. Twin-clutch transmissions are used in vehicles, for example, to facilitate a gear shifting without any interruption of the tractive force. Twin-clutch transmissions of this kind, in particular, have twin- or combi-clutch systems.

Such twin-clutch systems are actuated via at least one clutch-release system. In this context, every clutch-release system or the bearing for each clutch can be mounted on the clutch cover or in the clutch bell housing. This increases the requirement for rigidity for each clutch cover, in order to be able to absorb the force acting on the particular clutch cover. The need arises, in particular, for a cover-mounted bearing when using a traction-slip control for the clutches.

SUMMARY OF THE INVENTION

An object of the present invention is, therefore, to propose a twin-clutch system for which the mechanical loading capacity of the clutch cover will be increased, in particular.

The present invention provides a twin-clutch system for a transmission, in particular for a twin-clutch transmission, having at least two clutches, each of which has a clutch cover, to which at least one clutch-release system for actuating the clutches is attached, a fastening member for coupling the two clutch covers being provided. In this manner, the clutch covers of the twin-clutch system are fastened to one another, thereby altogether enhancing the rigidity or loading capacity.

Within the scope of one advantageous embodiment of the present invention, it may be provided for at least one connecting element to be used as a fastening member, which interconnects the two clutch covers. Besides enhancing the rigidity of the cover-mounted bearing, i.e., the bearing of the clutch itself, advantages are also derived for actuation of the clutch. The deformations caused by the clutch-release forces are reduced, and the controllability of the clutches is improved on the whole.

Preferably, one or even a plurality of bolt-shaped connecting elements may be used, which have receiving sections at their ends, for example. As receiving sections, annular grooves or the like may preferably be used. Other suitable connection possibilities may also be employed, however, to increase the loading capacity of the clutch cover.

BRIEF DESCRIPTION OF THE DRAWINGS

Other advantages and advantageous embodiments are derived from the dependent claims and from the drawing described in the following.

The only FIGURE of the present invention shows a cross-sectional detail of a twin-clutch system according to the present invention.

DETAILED DESCRIPTION

The proposed twin-clutch system is part of a twin-clutch transmission, the twin clutch including a first clutch 101 as a start-up clutch and a second clutch 102 as a power-shift clutch. The two clutches 101, 102 each have a clutch cover 103, 104. Additionally, bearing 105 is provided on clutch cover 103. Two torsion dampers 106, 107 for clutches 101, 102 are also shown. Moreover, one part of crankshaft 108 of the vehicle is indicated. The illustrated twin clutch is actuated via at least one clutch-release system 109.

In accordance with the present invention, at least one fastening member is provided. In the exemplary embodiment shown here, a bolt-shaped connecting element 110 is used as a fastening member to couple clutch cover 103 of clutch 101 to clutch cover 104 of clutch 102. In addition, receiving sections are provided at each of the two ends of bolt-shaped connecting element 10. The receiving sections are formed as annular grooves 111, 112, in which clutch covers 103 and 104 are secured, respectively. In this manner, the loading capacity of clutch covers 103, 104 is advantageously increased.

The claims filed with the application are proposed formulations and do not prejudice the attainment of further patent protection. The applicant reserves the right to claim still other combinations of features that, so far, have only been disclosed in the specification and/or the drawings.

The antecedents used in the dependent claims refer, by the features of the respective dependent claim, to a further embodiment of the subject matter of the main claim; they are not to be understood as renouncing attainment of an independent protection of subject matter for the combinations of features of the dependent claims having the main claim as antecedent reference.

Since, in view of the related art on the priority date, the subject matters of the dependent claims may form separate and independent inventions, the applicant reserves the right to make them the subject matter of independent claims or of divisional applications. In addition, they may also include independent inventions, whose creation is independent of the subject matters of the preceding dependent claims.

The exemplary embodiments are not to be understood as limiting the scope of the invention. Rather, within the framework of the present disclosure, numerous revisions and modifications are possible, in particular such variants, elements and combinations and/or materials, which, for example, by combining or altering individual features or elements or method steps described in connection with the general description and specific embodiments, as well as the claims, and contained in the drawings, may be inferred by one skilled in the art with regard to achieving the objective, and lead, through combinable features, to a new subject matter or to new method steps or sequences of method steps, also to the extent that they relate to manufacturing, testing, and operating methods.

What is claimed is:

1. A twin-clutch system for a transmission, comprising:
   at least two clutches, each clutch having a clutch disk, a pressure plate and a counter pressure plate, wherein the respective clutch disk is between the pressure plate and the counter pressure plate, the two clutches defining a first side and a second side;
   a clutch cover for each one of the at least two clutches, the clutch covers being arranged on the first side of the clutches;
   at least one clutch-release system arranged to actuate the at least two clutches;
   the at least one clutch-release system being secured to at least one of the clutch covers, and;
   a fastening member for coupling the clutch covers to one another, the fastening member coupling the clutch covers to one another and spacing the clutch covers from one another.

2. The twin-clutch system of claim 1, wherein the fastening member comprises at least one connecting element arranged to interconnect the clutch covers to one another.

3. The twin-clutch system of claim 2, wherein the connecting element comprises a bolt-shaped connecting element.

4. The twin-clutch system of claim 3, wherein the bolt-shaped connecting element has two ends, each end being fastened to a respective clutch cover.

5. The twin-clutch system of claim 4, wherein each end of the bolt-shaped connecting element includes a receiving section.

6. The twin-clutch system of claim 5, wherein each receiving section comprises an annular groove.

7. The twin clutch system of claim 3, wherein the bolt shaped connecting element is a spacer bolt.

8. The twin-clutch system of claim 1, further comprising a housing for the twin-clutch system, and wherein each clutch cover is fastened to the housing.

9. The twin-clutch system of claim 1, wherein the transmission is a twin-clutch transmission.

* * * * *